United States Patent
Giacomelli et al.

(10) Patent No.: US 7,264,015 B2
(45) Date of Patent: Sep. 4, 2007

(54) NON-RETURN VALVE FOR A PETROCHEMICAL REACTOR

(75) Inventors: Maurizio Giacomelli, Marina Di Carrara (IT); Emiliano Lazzerini, Valdicastello Pietrasanta (IT); Stefano Ricci, Avenza (IT)

(73) Assignee: Nuovo Pignone Holding S.p.A., Florence (IT)

( * ) Notice: Subject to any disclaimer, the term of this patent is extended or adjusted under 35 U.S.C. 154(b) by 285 days.

(21) Appl. No.: 10/497,314

(22) PCT Filed: Oct. 1, 2003

(86) PCT No.: PCT/EP03/11062

§ 371 (c)(1),
(2), (4) Date: Jan. 5, 2005

(87) PCT Pub. No.: WO2004/030804

PCT Pub. Date: Apr. 15, 2004

(65) Prior Publication Data

US 2005/0103384 A1    May 19, 2005

(30) Foreign Application Priority Data

Oct. 3, 2002    (IT)    .................. MI2002A2092

(51) Int. Cl.
*F16K 15/04*    (2006.01)
*F16K 15/02*    (2006.01)

(52) U.S. Cl. ............................ 137/454.2; 137/533.11
(58) Field of Classification Search ............ 137/454.2, 137/533.11, 533.13, 533.15
See application file for complete search history.

(56) References Cited

U.S. PATENT DOCUMENTS

| | | | | |
|---|---|---|---|---|
| 136,412 A | * | 3/1873 | Chapman et al. ........ | 137/454.2 |
| 139,018 A | * | 5/1873 | Morrison ................ | 137/533.13 |
| 2,192,541 A | * | 3/1940 | Davis ...................... | 137/454.2 |
| 3,026,903 A | * | 3/1962 | Roach .................... | 137/533.13 |
| 4,568,337 A | * | 2/1986 | Treharne et al. ........ | 137/533.11 |
| 4,816,137 A | | 3/1989 | Newman et al. | |
| 5,095,940 A | * | 3/1992 | Saur et al. ............. | 137/533.11 |

FOREIGN PATENT DOCUMENTS

WO        00/61704 A    10/2000

* cited by examiner

*Primary Examiner*—John Rivell
(74) *Attorney, Agent, or Firm*—Nixon & Vanderhye, PC

(57) ABSTRACT

A rapidly replaceable non-return device (110) for a petrochemical refinery reactor (112), of the type comprising: a support tube (114), connected to a portion of the reactor (112), this support tube (114) being provided internally with a cartridge (116) containing a ball (118), the cartridge (116) having, around an inlet hole (121) for a processed fluid, a seat (122) for housing the ball (118), and having slots (120) for the outflow of the said processed fluid; the cartridge (116) is fitted removably in the support tube (114).

11 Claims, 2 Drawing Sheets

NON-RETURN VALVE FOR A PETROCHEMICAL REACTOR

Figure 1:
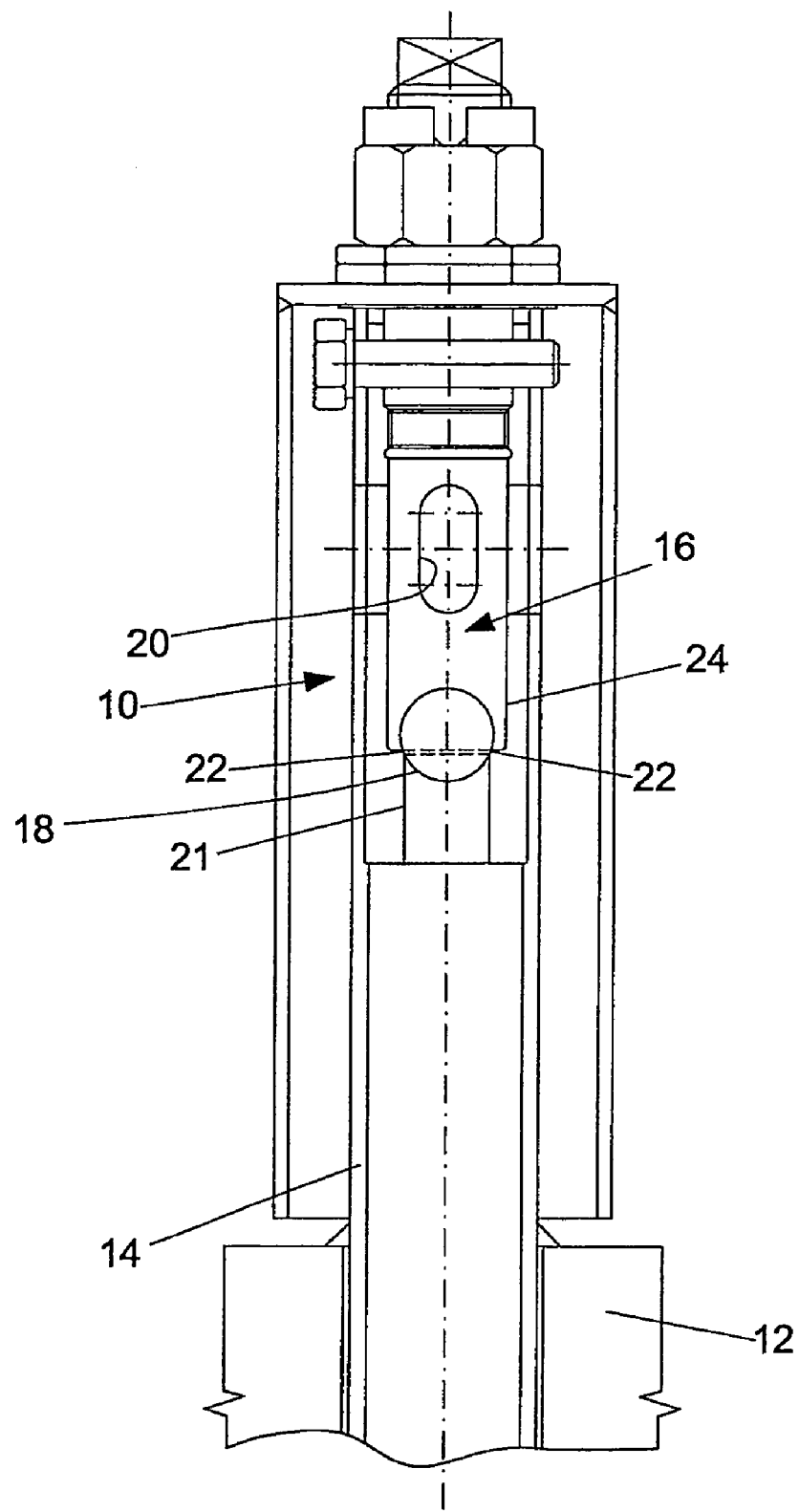

This application is the U.S. national phase of international application PCT/EP2003/011062 filed in English on 1 Oct. 2003, which designated the U.S. PCT/EP2003/011062 claims priority to IT Application No. MI2002A002092 filed 3 Oct. 2002. The entire contents of these applications are incorporated herein by reference.

The present invention relates to a rapidly replaceable non-return device for a petrochemical refinery reactor. Cylindrical devices acting as non-return valves are used in petroleum refinery reactors in some petrochemical processes. These devices allow the product subjected to the refining process to flow in one direction, while preventing the backward flow of the product and of any particles of catalyst which would damage the equipment located upstream of the said devices.

In the current technical language these cylindrical devices are called "risers".

Their operation is simple: each device has a terminal part housing a ball which is pushed by the pressure of the flow of the process fluid land is thus displaced axially until it uncovers radial slots through which the fluid can flow out.

Any back pressure pushes the ball towards a suitable shaped housing, allowing it to form a seal and thus prevent a flow in the backward direction.

Clearly, the axial and radial movements of the ball cause deformation, erosion and damage to its housing which result in the wear and sometimes the fracture of the said device, thus obliging the operator to replace it.

At the present time, these devices are either welded or fixed mechanically inside reactors, in a vertical position. The welding itself, as well as the formation of process residues, causes problems for the removal of the device, making the work slow and particularly difficult to carry out.

In the prior art, each non-return device is made in two or more parts, namely a support tube welded to the reactor and having within it a cylindrical cartridge which contains the ball and the sealing surface of the housing.

In fact, as described above, solid residues of the process fluid infiltrate between the contact surfaces of the cartridge and the support tube, thus practically bonding the two parts and making them very difficult to disassemble: the operator is frequently obliged to replace the whole device, with an increase in time and cost.

The object of the present invention is therefore to overcome the drawbacks mentioned above, in particular by providing a rapidly replaceable non-return device for a petrochemical refinery reactor which enables the plant downtime to be limited.

Another object of the present invention is to provide a rapidly replaceable non-return device for a petrochemical refinery reactor which makes it possible to have assured replacement times, so that plant downtime can be correctly scheduled.

A further object of the present invention is to provide a rapidly replaceable non-return device for a petrochemical refinery reactor which is particularly reliable, simple, functional and relatively inexpensive.

These and other objects of the present invention are achieved by providing a rapidly replaceable non-return device for a petrochemical refinery reactor as described in claim 1.

Further characteristics of a rapidly replaceable non-return device for a petrochemical refinery reactor are specified in the subsequent claims.

Figure 2:
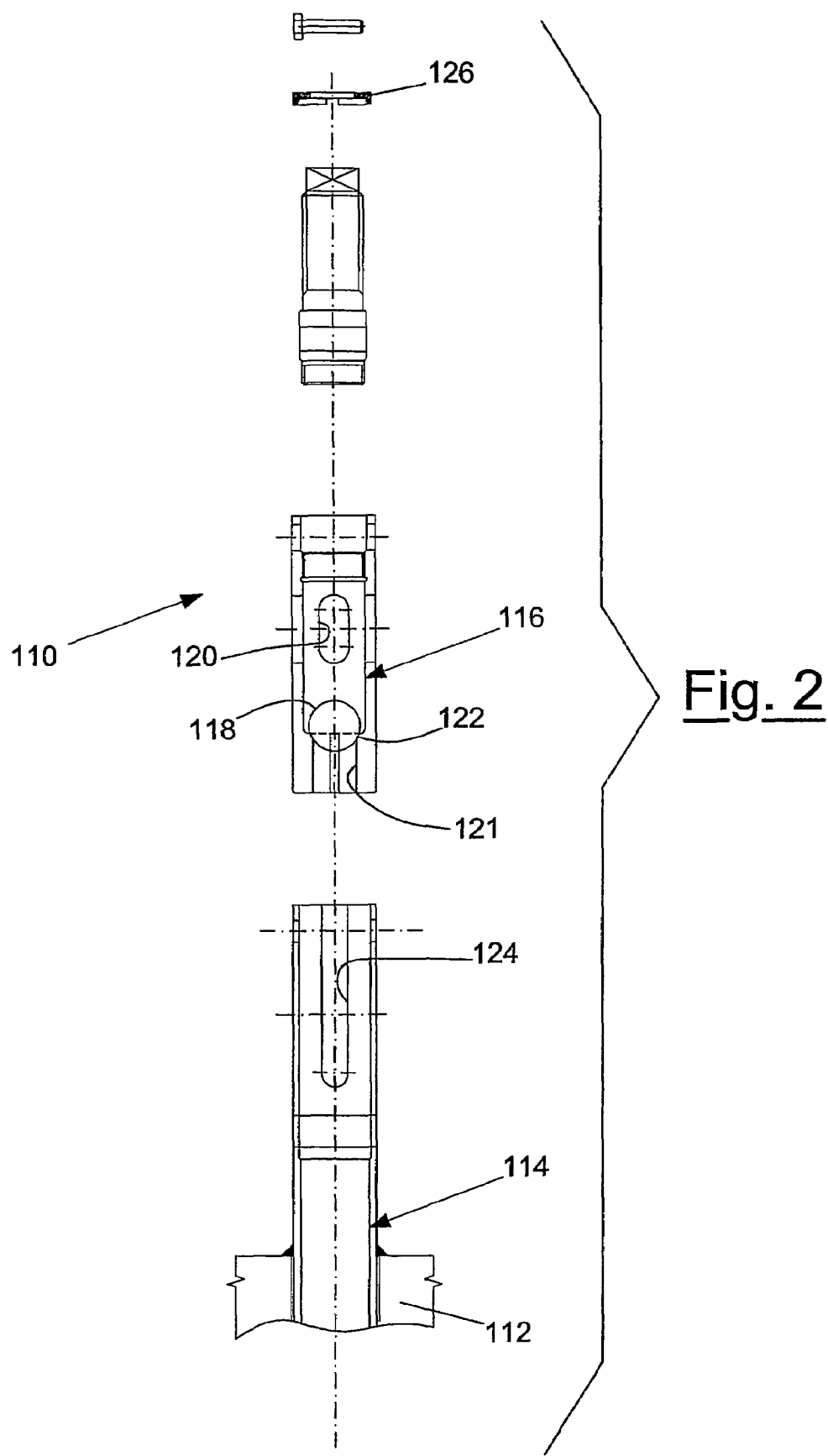

The characteristics and advantages of a rapidly replaceable non-return device for a petrochemical refinery reactor according to the present invention will be made clearer by the following description, provided by way of example and without restrictive intent, with reference to the attached schematic drawings in which:

FIG. 1 is a sectional view in lateral elevation of a non-return device for a petrochemical refinery reactor according to the known art; and FIG. 2 shows a sectional exploded view of a rapidly replaceable non-return device for a petrochemical refinery reactor according to the present invention.

With reference to FIG. 1, this shows a non-return device, indicated as a whole by 10, for a petrochemical refinery reactor 12 according to the known art.

The non-return device 10 comprises a support tube 14, connected to a portion of the reactor 12, within which is fitted a cylindrical cartridge 16 which contains a ball 18.

The cartridge 16 has lateral slots 20 for the outflow of the processed fluid, which also passes through corresponding apertures in the support tube 14 in which the cartridge 16 is inserted.

The cartridge 16 also has in its lower part, around an inlet hole 21 for the processed fluid, a seat 22 for housing the ball 18.

In the example in FIG. 1, it can be seen that the support tube 14 is welded on to a portion of the reactor 12 in a vertical position. Alternatively, this support tube 14 can be fixed by mechanical means.

FIG. 2 shows a rapidly replaceable non-return device 110 for a petrochemical refinery reactor 112, according to the present invention, in which components identical and/or equivalent to those of the known art shown in FIG. 1 are given the same reference numbers with the addition of 100.

The non-return device 110 comprises a support tube 114, connected to a portion of a reactor 112, within which is provided a cylindrical cartridge 116 containing a ball 118.

The cartridge 116 has lateral slots 120 for the outflow of the processed fluid, which also passes through corresponding apertures in the support tube 114 in which the cartridge 116 is inserted.

The cartridge 116 also has in its lower part, around an inlet hole 121 for the processed fluid, a seat 122 for housing the ball 118.

In the example of FIG. 2 it can be seen that the support tube 114 is welded on to a portion of the reactor 112, in a vertical position. Alternatively, this support tube 114 can be fixed by mechanical means. The cartridge 116 is positioned in the support tube 114 in a removable way. This is done by providing the support tube 114 with a significant degree of deformability and elasticity in the area housing the cartridge 116, or by providing particular geometrical shapes for a coupling, of the conical type for example, between the cartridge 116 and the support tube 114, to facilitate the extraction of the cartridge.

The extraction can be facilitated by using suitable materials, heat treatments, machining by stock removal, or plastic treatment.

By way of example and without restrictive intent, FIG. 2 shows how at least one longitudinal aperture 124 is formed in the support tube 114, in the area housing the cartridge 116. These longitudinal apertures 124 can be, for example, milled cuts made along the axis of the support tube 114. More precisely, these milled cuts are created from an upper edge of this support tube 114.

A taper washer 126 is also provided for fixing the cartridge 116 to the support tube 114.

The operation of the rapidly replaceable non-return device 110 for a petrochemical refinery reactor according to the invention is clearly indicated by the above description provided with reference to the figures, and is briefly as follows.

The ball 118 is pushed by the pressure of the flow of the process fluid which enters through the inlet hole 121, and is displaced axially until it uncovers the slots 120 through which the fluid flows out.

Any back pressure pushes the ball 118 towards the seat 122, which is suitably shaped, enabling these components to form a seal and thus preventing the backward flow of the processed fluid.

If the non-return device 110, and particularly the seat 122, becomes damaged, the cartridge 116 is replaced in order to bring the device 110 back into good working order.

The replacement of the cartridge 116 is made rapid and easy by the apertures 124 formed in the tube 124, which give the tube 124 an elasticity such that its upper part can be widened during the removal of the cartridge 116.

When the damaged cartridge 116 has been removed and replaced with a new cartridge 116, the taper washer 126 fixes the new device 110 and ensures proper adhesion between the support tube 114 and the new cartridge 116. The characteristics of the rapidly replaceable non-return device for a petrochemical refinery reactor according to the present invention, and the advantages thereof, are clear from the above description.

The following remarks and comments will be made in conclusion, in order to define the aforesaid advantages more precisely and clearly.

In the first place, it should be noted that the non-return device according to the present invention does not have to be replaced as a whole, in case of damage to the cartridge, except, obviously, in case of damage which may occasionally occur to the support tube.

The replacement time for the non-return device is therefore reduced.

The advantage of having assured replacement times, and consequently the possibility of correctly scheduling plant downtimes, should also be emphasized.

Additionally, the use of non-return devices according to the invention ensures that reactors will always operate with non-return devices in optimal conditions, because of the rapidity of replacement.

Finally, it is pointed out the simplicity and reliability of use of the non-return devices according to the invention, and the low production costs, with respect to the known art.

Clearly, the rapidly replaceable non-return device for a petrochemical refinery reactor designed as stated can be modified and varied in numerous ways within the scope of the invention; all components can also be replaced with technical equivalent elements. In practice, the materials used, and their forms and dimensions, can be chosen at will according to technical requirements.

The scope of protection of the invention is thus delimited by the attached claims.

The invention claimed is:

1. Rapidly replaceable non-return device (110) for a petrochemical refinery reactor (112), of the type comprising a support tube (114), connected to a portion of the said reactor (112), the said support tube (114) being provided internally with a cartridge (116) containing a ball (118), the cartridge (116) having, around an inlet hole (121) for a processed fluid, a seat (122) for housing the said ball (118), and having slots (120) for the outflow of the said processed fluid, wherein at least one longitudinal aperture (124) is formed in the said support tube (114), and said cartridge (116) is fitted removably in the said support tube (114).

2. Non-return device (110) according to claim 1, wherein said at least one longitudinal aperture (124) is a milled cut formed along the axis of the said support tube (114).

3. Non-return device (110) according to claim 2, wherein said milled cut is created from an upper edge of the said support tube (114).

4. Non-return device (110) according to claim 1, wherein said cartridge (116) is cylindrical.

5. Non-return device (110) according to claim 1, wherein said slots (120) are formed laterally in the said cartridge (116) and wherein a plurality of apertures in the said support tube (114) correspond to the said slots (120).

6. Non-return device (110) according to claim 1, wherein said seat (122) is provided in the lower part of the said cartridge (116).

7. Non-return device (110) according to claim 1, wherein said support tube (114) is welded on to a portion of the said reactor (112), in a vertical position.

8. Non-return device (110) according to claim 1, wherein said support tube (114) is fixed mechanically to a portion of the said reactor (112).

9. Non-return device (110) according to claim 1, wherein said at least one longitudinal aperture (124) is formed in an area in which the said cartridge (116) is housed.

10. Non-return device (110) according to claim 1, wherein said seat (122) is suitably shaped to form a seal in conjunction with the said ball (118).

11. Rapidly replaceable non-return device (110) for a petrochemical refinery reactor (112), of the type comprising a support tube (114), connected to a portion of the said reactor (112), the said support tube (114) being provided internally with a cartridge (116) containing a ball (118), the cartridge (116) having, around an inlet hole (121) for a processed fluid, a seat (122) for housing the said ball (118), and having slots (120) for the outflow of the said processed fluid, said cartridge (116) is fitted removably in the said support tube (114), wherein a taper washer (126) is provided for fixing the said cartridge (116) to the said support tube (114).

* * * * *